(12) United States Patent
Ichinose

(10) Patent No.: US 7,957,037 B2
(45) Date of Patent: Jun. 7, 2011

(54) IMAGE READING APPARATUS

(75) Inventor: Hayato Ichinose, Minamikoma-gun (JP)

(73) Assignee: Nisca Corporation, Yamanashi (JP)

( * ) Notice: Subject to any disclaimer, the term of this patent is extended or adjusted under 35 U.S.C. 154(b) by 113 days.

(21) Appl. No.: 12/385,640

(22) Filed: Apr. 15, 2009

(65) Prior Publication Data
US 2009/0268263 A1  Oct. 29, 2009

(30) Foreign Application Priority Data
Apr. 25, 2008 (JP) .................................. 2008-115610

(51) Int. Cl.
*H04N 1/40* (2006.01)
*H04N 1/00* (2006.01)

(52) U.S. Cl. ........ 358/471; 358/474; 358/497; 358/401; 358/496

(58) Field of Classification Search .................. 358/471, 358/497, 474, 494, 401, 400, 501, 500, 496; 361/679.47, 679.48, 679.5, 679.51; 399/44, 399/94, 69, 211, 212; 250/234–236, 216; 362/580, 547, 218, 264, 294, 235, 373
See application file for complete search history.

(56) References Cited

U.S. PATENT DOCUMENTS

| | | | | |
|---|---|---|---|---|
| 4,214,832 A | * | 7/1980 | Kono et al. | 399/200 |
| 5,647,727 A | * | 7/1997 | Taniguchi et al. | 417/32 |
| 7,420,716 B2 | * | 9/2008 | Aoyama et al. | 358/474 |
| 7,474,528 B1 | * | 1/2009 | Olesiewicz et al. | 361/695 |
| 7,603,050 B2 | * | 10/2009 | Kim | 399/92 |
| 7,733,543 B2 | * | 6/2010 | Mikajiri et al. | 358/475 |
| 2008/0038008 A1 | * | 2/2008 | Fujita et al. | 399/92 |
| 2010/0142008 A1 | * | 6/2010 | Beegle et al. | 358/475 |

FOREIGN PATENT DOCUMENTS

| JP | H11-194701 | | 7/1999 |
|---|---|---|---|
| JP | 2000115460 A | * | 4/2000 |

\* cited by examiner

*Primary Examiner* — Cheukfan Lee
(74) *Attorney, Agent, or Firm* — Manabu Kanesaka

(57) ABSTRACT

To provide an image reading apparatus enabling a long light source inside the image reading apparatus to be uniformly cooled in the main scanning direction with a simplified structure without increasing the number of components of the apparatus. An image reading apparatus having an optical reader section that has a long light source along the main scanning direction to read an original, a first holding section that holds the light source, a second holding section adjacent to the first holding section on the side surface side in the sub-scanning direction orthogonal to the main scanning direction of the first holding section, and a partition disposed between the first holding section and the second holding section, where in the partition are formed a first ventilating opening comprised of one or more openings for air inside the first holding section to move to the inside of the second holing section, and second ventilating openings comprised of a plurality of openings provided in the main scanning direction for the air inside the second holding section to move to the inside of the first holding section.

8 Claims, 4 Drawing Sheets

ADF READING POSITION

IMAGE READING APPARATUS

BACKGROUND OF THE INVENTION AND RELATED ART STATEMENT

The present invention relates to an image reading apparatus for reading an image of an original sheet, and more particularly, to an image reading apparatus enabling a long light source in the main scanning direction to be cooled uniformly.

In image reading apparatuses installed in copying machines, scanners, facsimiles and the like, generally, an original is irradiated with light, the reflected light is passed through lenses to form an image and applied to an image sensor such as a CCD and the like, the image sensor converts the image into electronic data, and the image data is thus obtained. In such an image reading apparatus, a halogen lamp, xenon lamp and the like have conventionally been used as a light source.

These lamps generate the large amount of emission, but have a defect of also generating the large amount of heat. As the lamp temperature increases, when an inverter for power supply is disposed near the lamp, there is the fear that an electronic component of the inverter cannot operate normally because of overheating and that life of the lamp decreases and cannot emit the light. Further, when the heat of the lamp is conducted to platen glass which a user contacts and the temperature of the platen glass increases to a predetermined temperature or more, another problem also arises in safety to the human body.

Particularly, in the case of the image reading apparatus using an automatic document feeder (ADF), the lamp is continued to emit the light for a long time to read a number of originals, and the temperature of the lamp increases excessively. In recent years, a larger amount of light has increasingly been required to enhance the reading speed of the image reading apparatus, and has remarkably increased the temperature of the lamp. Generally, in the image reading apparatus is used a rod-shaped lamp long in the main scanning direction, and when the temperature difference in the longitudinal direction of the light source increases, the amount of light emission becomes nonuniform in the main scanning direction for reading an original, and image data to acquire deteriorates. Further, when the temperature difference is large, another problem arises that the lamp is not lighted. Therefore, in cooling the lamp, such a consideration has been required that the temperature becomes uniform in the lamp long in the scanning direction.

Then, it is important to dissipate heat liberated from the lamp to suppress overheating of an optical reader apparatus containing an inverter. Therefore, various methods have conventionally been considered such as blowing air to the lamp using a fan to cool and the like. As a conventional lamp cooling method to uniform temperatures in the main scanning direction, for example, an image reading apparatus is disclosed in Patent Document 1 (Japanese Laid-Open Patent Publication No. H11-194701). In this apparatus, in order to uniform the cooling wind from blowing cooling means (cooling fan) in the main scanning direction, a second scanning section (second carriage) is provided with a fin that is deflection means of the cooling wind.

However, in the conventional image reading apparatus as shown in Patent Document 1, it is necessary to newly install a fin for deflecting the cooling wind from the cooling fan, and the problem arises that the cost increases because of an increase in the number of components.

In view of the above-mentioned conventional problem, it is an object of the invention to provide an image reading apparatus enabling a long light source inside the image reading apparatus to be uniformly cooled in the main scanning direction with a simplified structure without increasing the number of components.

SUMMARY OF THE INVENTION

Therefore, the invention provides an image reading apparatus characterized by having an optical reader section that has a long light source along the main scanning direction to read an original, a first holding section that holds the light source, a second holding section adjacent to the first holding section on the side surface side in the sub-scanning direction orthogonal to the main scanning direction of the first holding section, and a partition disposed between the first holding section and the second holding section, where in the partition are formed a first ventilating opening comprised of one or more openings for air inside the first holding section to move to the inside of the second holing section, and second ventilating openings comprised of a plurality of openings provided in the main scanning direction for the air inside the second holding section to move to the inside of the first holding section.

By this means, the image reading apparatus is capable of uniformly cooling a light source inside the image reading apparatus in the main scanning direction with a simplified structure for only forming ventilating openings without adding a new component. The present invention is applicable to not only image reading apparatuses provided with a platen but also sheet-through type (Automatic Document Feeder (ADF) mode) image reading apparatuses without a platen. Further, the invention is applicable to image reading apparatuses provided with both original reading modes of the platen reading mode and ADF mode.

Moreover, to solve the above-mentioned problem, the invention provides an image reading apparatus characterized by having an original mount to mount an original, an optical reader section which has a long light source along the main scanning direction, and reads the original on the original mount by moving the light source in the sub-scanning direction in reading the original resting on the original mount, while reading an original by resting the light source in a predetermined reading position on one end side in the sub-scanning direction in a predetermined area in reading the original that is fed, a first holding section that holds the light source, and a second holding section provided on the one end side in the sub-scanning direction of the first holding section to adjoin to the first holding section via a partition, where in the partition are formed a first ventilating opening comprised of one or more openings for the air inside the first holding section to move to the inside of the second holing section, and second ventilating openings comprised of a plurality of openings provided in the main scanning direction for the air inside the second holding section to move to the inside of the first holding section.

The image reading apparatus of the invention is configured as described above, and therefore, capable of uniformly cooling the light source in the main scanning direction from the vicinity of the ADF reading position in the ADF mode for particularly increasing the temperature of the light source.

Herein, it is preferable that the second ventilating openings are formed above the first ventilating opening. By thus configuring, it is possible to convect the cooler air from the lower side in the first holding section to the upper side in the first holding section where the light source is located, and to efficiently cool the light source.

Further, it is preferable that the air blowing means is disposed substantially in the central portion in the main scanning direction on the partition, and that the second ventilating openings are formed on the opposite sides of the installation position of the air blowing means. By thus configuring, it is possible to further uniformly cool the light source in the main scanning direction.

Furthermore, in the image reading apparatus, it is preferable in the second ventilating openings that the number of openings disposed on the side of power supply to the light source on one side in the main scanning direction is higher than the number of openings disposed on the other side in the main scanning direction. By thus configuring, cooling efficiency is enhanced on the power supply side with higher temperatures, and it is possible to actualize uniform cooling for the light source in the main scanning direction.

Meanwhile, the optical reader section is provided with a first support member that supports the light source, and a first reflecting member that reflects reflected light from the original, and a second support member that supports a second reflecting member that reflects reflected light from the first reflecting member, a third reflecting member that reflects reflected light from the second reflecting member, and a fixing member that fixes the second reflecting member and the third reflecting member, and in the fixing member, an opening may be formed in a position opposite to the first ventilating opening. By thus configuring, it is intended to prevent convection of air for cooling the light source from being blocked by the fixing member positioned between the first ventilating opening and the light source.

According to the image reading apparatus of the invention, it is possible to uniformly cool a light source inside the image reading apparatus in the main scanning direction with a simplified structure for only forming ventilating openings without adding a new component to the conventional image reading apparatus. Particularly, in the ADF mode where the temperature of the light source further increases, it is possible to efficiently cool the light source from the vicinity of the ADF reading position uniformly in the main scanning direction.

DETAILED DESCRIPTION OF PREFERRED EMBODIMENT

An embodiment of the invention will specifically be described below with reference to accompanying drawings.

Figure 1:
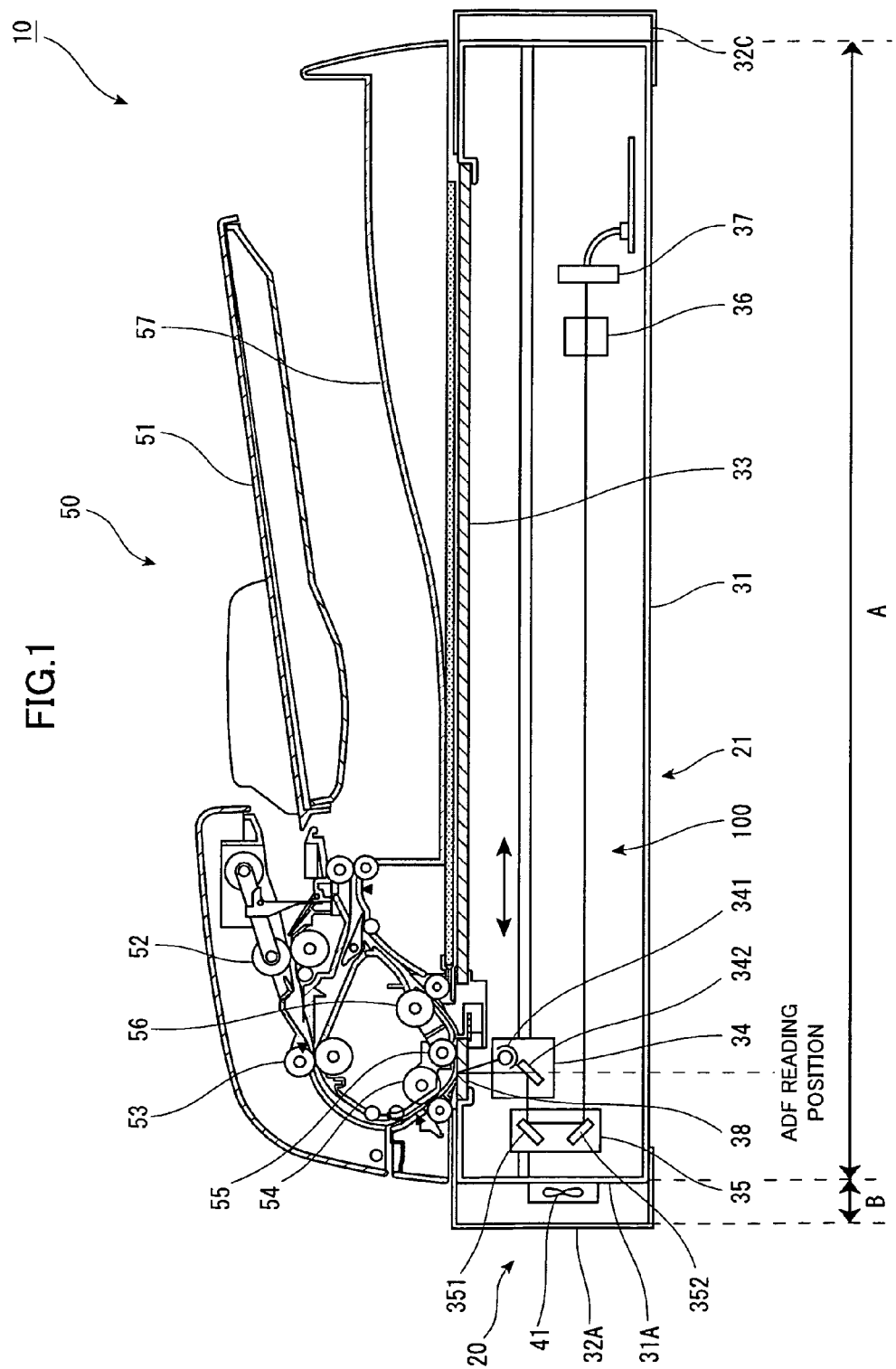
FIG. 1 is an entire sectional view showing a configuration of an image reading apparatus according to an embodiment of the invention.
Figure 2:
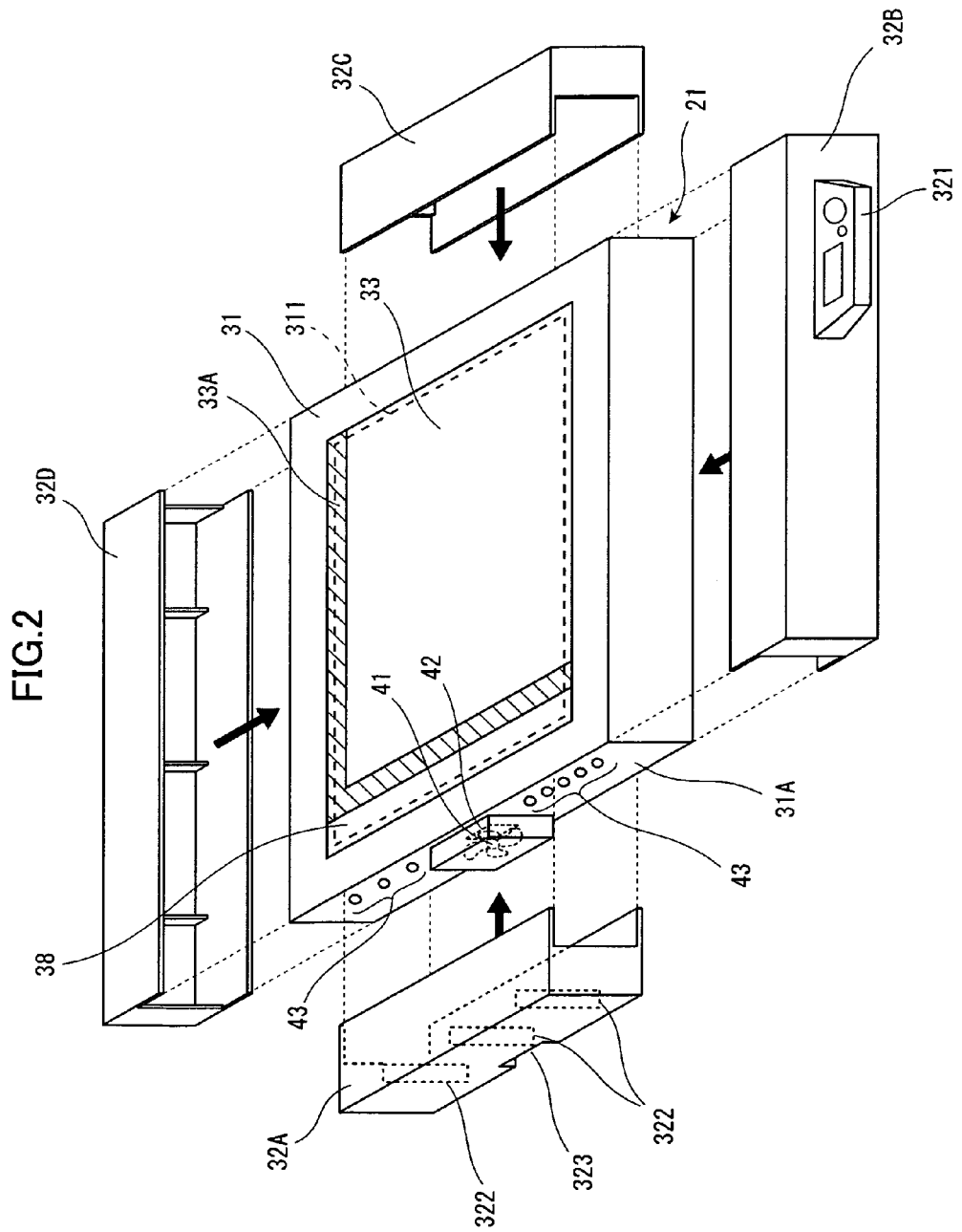
FIG. 2 is an exploded perspective view of a scanner unit in the image reading apparatus according to the embodiment of the invention.

FIG. 1 is an entire sectional view showing a configuration of an image reading apparatus according to an embodiment of the invention, and FIG. 2 is an exploded perspective view of a scanner unit in the image reading apparatus. As shown in FIG. 1, the image reading apparatus 10 of the invention is comprised of a scanner unit 20 and original feeding unit 50.

Further, as shown in FIG. 2, the scanner unit 20 is formed of a scanner unit main body 21, and frame cover 32 (32A, 32B, 32C and 32D).

The frame cover 32 is a cover with which is covered a box-shaped frame 31 holding an optical reader section therein, and is formed of a side frame cover 32A disposed on the side face on the ADF reading position side of the scanner unit main body 21, front frame cover 32B disposed on the front side of the scanner unit main body 21, side frame cover 32C disposed on the side opposite to the ADF reading position of the scanner unit main body 21, and back frame cover 32D disposed on the rear side of the scanner unit main body 21.

The front frame cover 32B is provided with a control panel 321 on which are disposed a liquid crystal panel for a user to set reading conditions of an original, start key for executing a reading start and the like. Further, each of the side frame covers 32A and 32C is formed of a box-shaped member opened on the side in which the frame 31 is inserted, and insides thereof are hollow except a plurality of strengthening ribs being formed. On the lower side thereof is formed a grasp portion 323 used in lifting the scanner unit main body 21.

The scanner unit main body 21 is provided with the box-shaped metal frame 31 having an opening 311 on its top. In the opening 311 of the frame 31 are provided platen glass 33 to mount an original, window 38 to read the original in the ADF mode, and alignment member 33A. Further, inside the frame 31 is accommodated the optical reader section 100 for reading an original fed from the original feeding unit 50, or an original mounted on the platen glass 33. The optical reader section 100 is formed of a first carriage (first support member) 34, second carriage (second support member) 35, lens 36 for gathering reflected light from the original, and image sensor 37 that is photoelectric conversion means.

The first carriage 34 is installed with a lamp 341 that is a light source to apply light to the original, and a first mirror 342 to further reflect the light reflected by the original. Herein, used as the lamp 341 is a xenon lamp having a long shape in the main scanning direction.

The second carriage 35 is installed with a second mirror 351 and third mirror 352 each to further reflect the light from the original that is reflected by the first mirror 342 of the first carriage 34. Further, in the second carriage 35 is disposed a fixing member 353 (see FIG. 4) for supporting the second mirror 351 and third mirror 352. The first carriage 34 and second carriage 35 are provided to be able to reciprocate in the sub-scanning direction along the lower surface of the platen glass 33 inside the frame 31.

Next, the original feeding unit 50 is installed on the top of the scanner unit 20 to be able to open and close the platen glass 33 surface of the scanner unit 20 by a hinge. The original feeding unit 50 is provided with a feeding stacker 51 for holding originals loaded thereon, roller groups 52 to 56 for feeding and discharging an original, and a discharge tray 57 for collecting discharged originals.

In the case of the ADF mode for reading an original fed by the original feeding unit 50, originals on the feeding stacker 51 are divided and fed on a sheet basis by the feeding roller 52, and fed to a predetermined reading position by rotation of a resist roller pair 53 and then rotation of the feeding rollers 54 and 55. In the scanner unit 20, the first carriage 34 is halted in the predetermined reading position set under the window 38 for ADF reading, the second carriage 35 is halted near the first carriage, and the lamp 341 is lighted to apply the light to the original. The reflected light is gathered by the lens 36 via the first mirror 342, second mirror 351 and third mirror 352, subjected to photoelectric conversion in the image sensor 37, further subjected to various kinds of image processing, and output as image data. The original of which reading is finished is discharged onto the discharge tray 57 by rotation of the discharge roller 56.

In the case of the flat bed mode (FB mode) for reading an original mounted on the platen glass 33, the lamp 341 is lighted to apply the light to the original, and the original is read, while moving the first carriage 34 and second carriage 35 of the scanning unit 20 in the sub-scanning direction along the platen glass 33. Operations of the scanner unit 20 other than the aforementioned operation are the same as in the ADF mode as described above.

In the present invention, in the image reading apparatus 10 as described above, a fan 41 is installed on the ADF reading position side of the frame 31 to cool the lamp 341. Further, in order to uniformly cool the lamp 341 in the main scanning direction, the space inside the scanner unit 20 is divided into the first holding portion and the second holding portion, and ventilating openings are provided to circulate the air in both spaces. The configuration of the image reading apparatus of the invention will specifically be described below.

Figure 3:
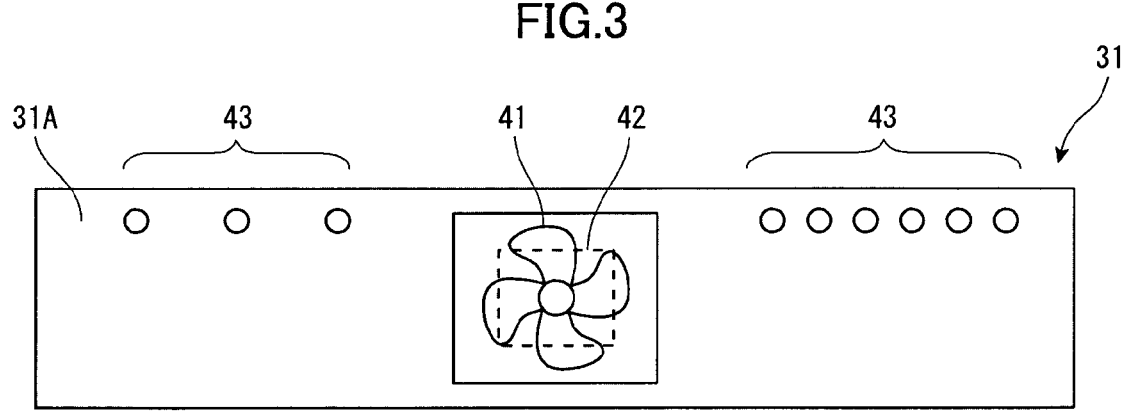
FIG. 3 is a side elevational view on the ADF reading position side of a scanner unit main body in the image reading apparatus according to the embodiment of the invention.
Figure 4A:
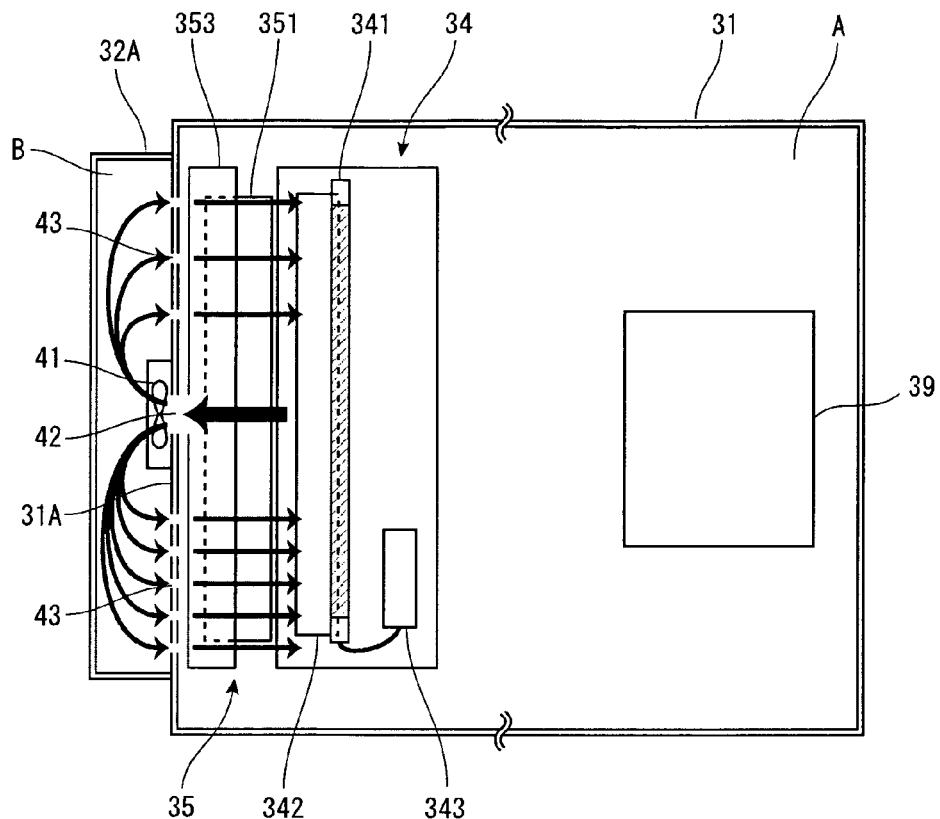
FIG. 4 is a schematic view to explain flows of air inside the scanner unit in the image reading apparatus according to the embodiment of the invention.
Figure 4B:
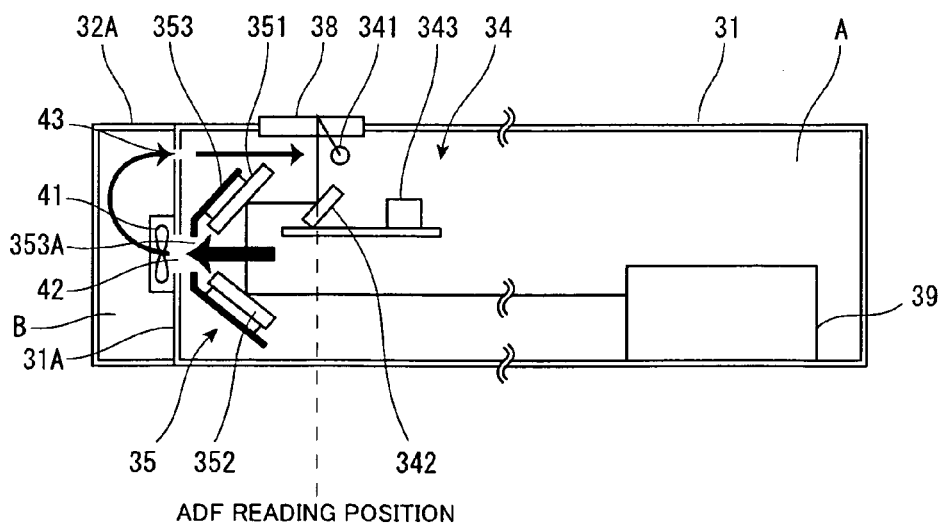

FIG. 3 is a side elevational view on the ADF reading position side of the scanner unit main body in the image reading apparatus according to the embodiment of the invention, and FIG. 4 is a schematic view to explain flows of air inside the scanner unit in the image reading apparatus where FIG. 4(*a*) is the top plan view of the scanner unit, and FIG. 4(*b*) is the side elevational view thereof.

Herein, as shown in FIGS. 1 and 4, in the space inside the scanner unit 20, the inside of the frame 31 is the first holding portion A, and the inside of the side frame cover 32A on the ADF reading position side is the second holding portion B. The principal purpose of the invention is to circulate the air inside the first holding portion A using the second holding portion B to cool the lamp 341. Therefore, a first ventilating opening 42 is provided in a side plate 31A (partition) on the ADF reading position side of the frame 31, while the fan 41 is disposed in a position overlapping the first ventilating opening 42. The blowing direction of the fan 41 is the direction in which the air is sucked from the first holding portion A, and discharged to the second holding portion B.

Meanwhile, a plurality of second ventilating openings 43 is provided in parallel with one another in the main scanning direction in the side plate 31A of the frame 31. As shown in FIG. 4, by the fan 41 rotating, the air discharged to the second holding portion B via the first ventilating opening 42 strikes the inner wall of the side frame cover 32A to diffuse, and flows again into the first holding portion A from the second ventilating openings 43.

Thus, the fan 41 and first ventilating opening 42 are disposed in the side plate 31A near the ADF reading position of the frame 31, the second ventilating openings 43 for sending the air to the first holding portion A are further provided in the side plate 31A, and it is thereby possible to efficiently cool the lamp 341 particularly in the ADF mode where the temperature of the lamp 341 is higher. Naturally, it is also possible to cool the lamp 341 in the FB mode.

Herein, as shown in FIG. 4(*a*), on the power supply side (on the inverter 343 installation side) of the lamp 341, the number of second ventilating openings 43 is higher than that on the other side, and the ventilating openings are arranged densely. This is because the temperature of the lamp 341 in the end portion on the side for receiving supply of power from the inverter 343 is higher than that at the other end. Therefore, by arranging the higher number of second ventilating openings opposite to the power supply side of the lamp 341 densely than the number of ventilating openings on the other side, it is possible to enhance cooling efficiency on the power supply side, and uniformly cool the lamp 341 in the main scanning direction.

Further, as shown in FIG. 3, a row of second ventilating openings 43 is disposed higher than the position of the first ventilating opening 42 (preferably, at the same height as that of the lamp 341 as shown in FIG. 4(*b*)). By thus configuring, the air blew from the second ventilating openings 43 is passed through the upper portion of the second carriage 35 and directly strikes the lamp 341. Further, the fan 41 is capable of sucking the air with lower temperatures inside the first holding portion A positioned under the lamp 341 from the first ventilating opening 42, and applying the air to the lamp 341 through the second ventilating openings 43. Thus, the lamp 341 can be cooled more efficiently.

Herein, as shown in FIG. 4(*b*), an opening 353A is provided in the fixing member 353 for supporting the second mirror 351 and third mirror 352 of the second carriage 35. The second carriage 35 is positioned in a place nearer the fan 41 than the position of the first carriage 34 when halted in the reading position, and commonly blocks the first ventilating opening 42. Therefore, in this embodiment, the opening 353A is provided in the position opposite to the first ventilating opening 42 of the fixing member 353 so as to prevent the flow of air from being blocked.

In addition, in this embodiment, cooling corresponding to the temperature distribution of the lamp 341 is performed by the number of second ventilating openings 43 and their arrangement, and it is achieved uniformly cooling the lamp 341 in the main scanning direction, but the invention is not limited thereto. For example, the same effect may be obtained by adjusting the shape and/or size of the second ventilating opening 43. Further, the number of second ventilating openings 43 and their arrangement shown in this embodiment and the figures are only of an example, and the same effect may be obtained by another aspect other than the aforementioned aspect.

Since the configuration is made as described above, according to the image reading apparatus of the invention, it is possible to cool a light source inside the image reading apparatus uniformly in the main scanning direction with a simplified structure for only forming ventilating openings without adding a new component to the conventional image reading apparatus. Particularly, in the ADF mode where the temperature of the light source further increases, it is possible to efficiently cool the light source from the vicinity of the ADF reading position uniformly in the main scanning direction.

The embodiment of the present invention is described above, but the present invention is not limited to the above-mentioned embodiment, and various modifications are capable of being made based on the subject matter of the invention and are not excluded from the scope of the invention.

This application claims priority from the Japanese patent application [Japanese Patent Application No. 2008-115610] incorporated herein by reference.

What is claimed is:
1. An image reading apparatus comprising:
   an optical reader section that has a long light source along a main scanning direction to read an original;
   a first holding section that holds the light source;
   a second holding section adjacent to the first holding section on a side surface side in a sub-scanning direction orthogonal to the main scanning direction of the first holding section;

a partition disposed between the first holding section and the second holding section, and an air blower for forming flows of air from the first holding section to the second holding section and back to the first holding section;

wherein the partition includes:

a first ventilating opening comprised of one or more openings for air inside the first holding section to move to an inside of the second holding section; and second ventilating openings comprised of a plurality of openings provided in the main scanning direction for the air inside the second holding section to move to an inside of the first holding section, wherein the plurality of openings of the second ventilating openings is disposed to open along the long light source higher than a position of the first ventilating opening to blow air to the light source; and the air blower is disposed in a position overlapping the first ventilating opening.

2. The image reading apparatus according to claim 1, further comprising an original mount to mount the original, wherein the optical reader section reads the original while moving the light source in the sub-scanning direction along the original mount inside the first holding section.

3. An image reading apparatus comprising:

an original mount to mount an original;

an optical reader section which has a long light source along a main scanning direction, and reads the original on the original mount by moving the light source in a sub-scanning direction in reading the original resting on the original mount, while reading the original by resting the light source in a predetermined reading position on one end side in the sub-scanning direction in a predetermined area in reading the original that is fed;

a first holding section that holds the light source; and a second holding section provided on one end side in the sub-scanning direction of the first holding section to adjoin to the first holding section via a partition; and an air blower for forming flows of air from the first holding section to the second holding section and back to the first holding section;

wherein the partition includes:

a first ventilating opening comprised of one or more openings for air inside the first holding section to move to an inside of the second holding section; and second ventilating openings comprised of a plurality of openings provided in the main scanning direction for the air inside the second holding section to move to an inside of the first holding section, wherein the plurality of openings of the second ventilating openings is disposed to open along the long light source higher than a position of the first ventilating opening to blow air to the light source; and the air blower is disposed in a position overlapping the first ventilating opening.

4. The image reading apparatus according to claim 3, wherein the air blower is disposed substantially in a central portion in the main scanning direction on the partition, and the second ventilating openings are formed on both sides of the air blower along the main scanning direction.

5. The image reading apparatus according to claim 4, wherein in the second ventilating openings, a number of openings disposed on a side of a power supply to the light source in the main scanning direction is higher than a number of openings disposed on the other side in the main scanning direction.

6. The image reading apparatus according to claim 3, wherein the first ventilating opening is larger than the second ventilating openings.

7. The image reading apparatus according to claim 3, wherein the optical reader section includes:

a first support member that supports the light source, and a first reflecting member that reflects reflected light from the original;

a second support member that supports a second reflecting member that reflects reflected light from the first reflecting member;

a third reflecting member that reflects reflected light from the second reflecting member; and a fixing member that fixes the second reflecting member and the third reflecting member, the fixing member having an opening formed in a position opposite to the first ventilating opening.

8. An image reading apparatus comprising:

an optical reader section that has a long light source along a main scanning-direction to read an original;

a first holding section that holds the light source;

a second holding section adjacent to the first holding section on a side surface side in a sub-scanning direction orthogonal to the main scanning direction of the first holding section;

a partition disposed between the first holding section and the second holding section; and an air blower for forming flows of air from the first holding section to the second holding section and back to the first holding section;

wherein the partition includes:

a first ventilating opening comprised of one or more openings for air inside the first holding section to move to an inside of the second holing section; and second ventilating openings comprised of a plurality of openings provided in the main scanning direction for the air inside the second holding section to move to an inside of the first holding section;

wherein the plurality of openings of the second ventilating openings is disposed to open along the long light source higher than a position of the first ventilating opening to blow air to the light source;

the air blower is disposed in a position overlapping the first ventilating opening; and the second ventilating openings are formed on both sides of the air blower along the main scanning direction.

* * * * *